(12) United States Patent
Hong et al.

(10) Patent No.: US 10,778,122 B2
(45) Date of Patent: Sep. 15, 2020

(54) CONNECTING DEVICE FOR MOTOR AND SUPPLY NETWORK

(71) Applicant: Eaton Corporation, Cleveland, OH (US)

(72) Inventors: Xiaoyuan Hong, Shenzhen (CN); Hao Luo, Shenzhen (CN); Kevin Lee, Menomonee Falls, WI (US)

(73) Assignee: Eaton Intelligent Power Limited, Dublin (IE)

( * ) Notice: Subject to any disclaimer, the term of this patent is extended or adjusted under 35 U.S.C. 154(b) by 617 days.

(21) Appl. No.: 15/053,680

(22) Filed: Feb. 25, 2016

(65) Prior Publication Data

US 2016/0254763 A1    Sep. 1, 2016

(30) Foreign Application Priority Data

Feb. 26, 2015  (CN) .......................... 2015 1 0088664

(51) Int. Cl.
  *H02P 27/04*   (2016.01)
  *H02P 1/52*    (2006.01)
  *H02P 1/30*    (2006.01)

(52) U.S. Cl.
  CPC . *H02P 1/52* (2013.01); *H02P 1/30* (2013.01)

(58) Field of Classification Search
  CPC .......... H02P 27/04; H02P 1/04; H02P 29/032; H02P 6/28; H02P 7/05; H02K 11/00; H02K 11/0094

(Continued)

(56) References Cited

U.S. PATENT DOCUMENTS 5,949,662 A * 9/1999 Boldin .................... H02J 9/062
                                                        363/37
6,163,129 A * 12/2000 Younger .................. H02P 1/26
                                                        318/798

(Continued)

FOREIGN PATENT DOCUMENTS

CN        201523347 U        7/2010

OTHER PUBLICATIONS

Lukitsch et al., "AC Drives and Soft Starter Application Guide," Winter 2008-2009 Neta World, pp. 1-5.

(Continued)

*Primary Examiner* — Thai T Dinh
(74) *Attorney, Agent, or Firm* — Ziolkowski Patent Solutions Group, SC

(57) ABSTRACT

A connecting device for motor and supply network is provided, comprising: a Variable Frequency Drive (VFD), a first switch ($S_1$) and a second switch ($S_2$), wherein the Variable Frequency Drive (VFD) is connected in series to the first switch ($S_1$), and the second switch ($S_2$) is connected in parallel to the series circuit composed of the Variable Frequency Drive (VFD) and the first switch ($S_1$). The connecting device of the invention further comprises a bidirectional Silicon Controlled Rectifier (SCR) or two anti-parallel single-directional Silicon Controlled Rectifiers (SCR1,SCR2), wherein the bidirectional Silicon Controlled Rectifier (SCR) or the two anti-parallel single-directional Silicon Controlled Rectifiers (SCR1,SCR2) is/are connected in parallel to the second switch ($S_2$). The connecting device of the present invention would not be subject to high current surge when VFD bypassing, avoids the high cost for the overrating of the cable and the bypassing switch, and is easy to be implemented.

8 Claims, 5 Drawing Sheets

(58) Field of Classification Search
USPC ....... 318/461, 431, 727, 752, 753, 778, 779, 318/786, 800, 801, 430
See application file for complete search history.

(56) References Cited

U.S. PATENT DOCUMENTS

| | | | | |
|---|---|---|---|---|
| 7,193,387 B1* | 3/2007 | Lu | ...................... | H02P 21/0017 318/431 |
| 7,265,458 B2* | 9/2007 | Edelen | ...................... | H02J 9/06 307/65 |
| 7,298,105 B1* | 11/2007 | Lu | ...................... | H02P 21/0017 318/432 |
| 7,952,318 B2* | 5/2011 | Lu | ...................... | H02P 23/14 318/490 |
| 8,853,992 B2* | 10/2014 | Boom | ...................... | H02P 23/02 318/727 |
| 10,284,006 B2* | 5/2019 | Toyoda | ...................... | H02J 3/46 |
| 10,551,444 B2* | 2/2020 | Sebald | ...................... | G01R 31/40 |
| 2009/0009001 A1* | 1/2009 | Marwali | ...................... | H02J 9/061 307/65 |
| 2009/0218962 A1* | 9/2009 | Kubal | ...................... | H02P 1/30 318/102 |
| 2012/0013193 A1* | 1/2012 | Sato | ...................... | H02J 9/062 307/80 |
| 2014/0021789 A1* | 1/2014 | Greer | ...................... | H02J 9/06 307/64 |
| 2014/0097690 A1* | 4/2014 | Costa | ...................... | H02J 9/061 307/64 |
| 2018/0191194 A1* | 7/2018 | Nakano | ...................... | H02M 7/5387 |

OTHER PUBLICATIONS

Lukitsch, "Soft Start Vs AC Drives—Understand the Differences," IEEE Annual Textile, Fiber and Film Industry Technical Conference, 1999, pp. 1-5.

"Choosing a Variable Frequency Drive or Soft Starter based on your application need," WEG Electric Corporation, 2016, pp. 1-5.

* cited by examiner

CONNECTING DEVICE FOR MOTOR AND SUPPLY NETWORK

CROSS-REFERENCE TO RELATED APPLICATION

The present application claims priority to Chinese Application No. 201510088664.2, filed Feb. 26, 2015, the disclosure of which is incorporated by reference herein in its entirety.

TECHNICAL FIELD

The present invention relates generally to the field of power industry and, more particularly, to a connecting device for motor and supply network.

BACKGROUND OF THE INVENTION

Motors are widely used in the fields such as information processing, aerospace, industrial and agricultural production, and the like. In the starting models of motors, the Variable Frequency Drive (VFD) is a motor controlling device having the highest technical content, the most controlling functions, and the best controlling effect, which adjusts the rotation speed and the torque of the motor by changing its output frequency and voltage. However, if it is required that the load of the motor allows continuous operation at a fixed frequency of the supply network (for example, the multi-pumps or multi-fans function in HVAC application), a contactor (contactors) is/are usually used to bypass for minimizing the power loss. Using the bypass, the motor disconnects from the VFD and connects directly to the supply network after starting.

FIG. 1 shows the structure diagram of a connecting device for motor and supply network of the prior art, wherein Grid represents the supply network, VFD represents the Variable Frequency Drive, M represents the motor, the first contactor $S_1$ represents an output contactor, and the second contactor $S_2$ represents a bypass contactor. In such a connecting device, because of the uncontrollable phase difference and amplitude difference between the voltage of the supply network and the voltage of the motor owing to the switch dead zones of the output contactor $S_1$ and the bypass contactor $S_2$, a switching current surge will occur when the motor is bypassed to the supply network (namely, the motor disconnects from the VFD and connects directly to the supply network).

SUMMARY OF INVENTION

In view of the foregoing, an object of the present invention is to provide a connecting device for motor and supply network, comprising: a Variable Frequency Drive (VFD), a first switch ($S_1$) and a second switch ($S_2$), wherein the Variable Frequency Drive (VFD) is connected in series to the first switch ($S_1$), and the second switch ($S_2$) is connected in parallel to the series circuit composed of the Variable Frequency Drive (VFD) and the first switch ($S_1$), which is characterized in that: further comprising a bidirectional Silicon Controlled Rectifier (SCR), which is connected in parallel to the second switch ($S_2$).

The present invention further provides another connecting device for motor and supply network, comprising: a Variable Frequency Drive (VFD), a first switch ($S_1$) and a second switch ($S_2$), wherein the Variable Frequency Drive (VFD) is connected in series to the first switch ($S_1$), and the second switch ($S_2$) is connected in parallel to the series circuit composed of the Variable Frequency Drive (VFD) and the first switch ($S_1$), which is characterized in that: further comprising two anti-parallel single-directional Silicon Controlled Rectifiers (SCR1,SCR2), which are connected in parallel to the second switch ($S_2$).

Preferably, the switch is a contactor.

Preferably, the connecting device of the present invention further comprises a control unit for giving commands.

Preferably, the control unit is arranged within the Variable Frequency Drive (VFD).

The connecting device of the present invention would not be subject to high current surge when VFD bypassing, avoids the high cost for the overrating of the cable and the bypassing switch, and is easy to be implemented.

BRIEF DESCRIPTION OF DRAWINGS

The present invention will be further explained in combination with the embodiments with reference to the accompanying figures, wherein.

DESCRIPTION OF EMBODIMENTS

In the following parts, the present invention will be described in greater details with reference to the embodiments and the accompanying drawings so as to make its objects, technical solutions and advantages clearer. It should be understood that the specific embodiments described herein only intend to interpret the present invention, without making any limitation thereto.

It is well known that Silicon Controlled Rectifier (SCR) (also referred to as thyristor) is a four-layer high-power semiconductor device with three PN junctions, which is one of the commonly used semiconductor devices for its small volume, simple structure and powerful functionality. In performance, the SCR is of not only unidirectional conductivity, but also high controllability, with only two states of "on" and "off", and can be "touch-and-go" (the response time is usually at the microsecond level).

Figure 2:
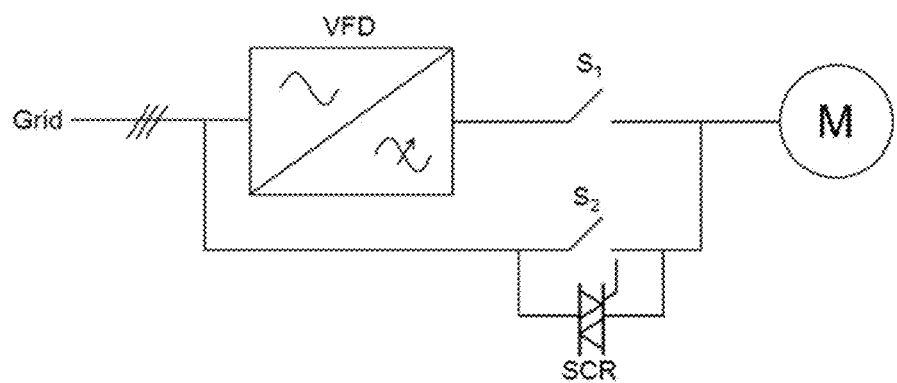
FIG. 2 is the structure diagram of the connecting device for motor and supply network according to one embodiment of the present invention.

FIG. 2 presents a connecting device for motor and supply network according to one embodiment of the present invention, comprising: a Variable Frequency Drive (VFD), a first contactor $S_1$, a second contactor $S_2$ and a bidirectional Silicon Controlled Rectifier (SCR), wherein the VFD is connected in series to the first contactor $S_1$, the second contactor $S_2$ and the bidirectional Silicon Controlled Rectifier (SCR) are respectively connected in parallel to the series circuit composed of the VFD and the first contactor $S_1$, and the VFD comprises a control unit for giving commands.

Figure 1:
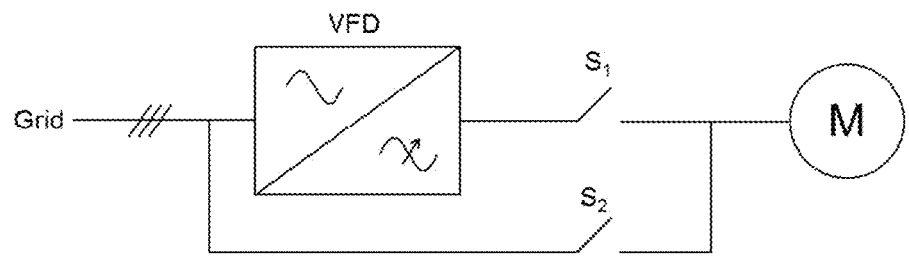
FIG. 1 is the structure diagram of a connecting device for motor and supply network of the prior art.
Figure 3:
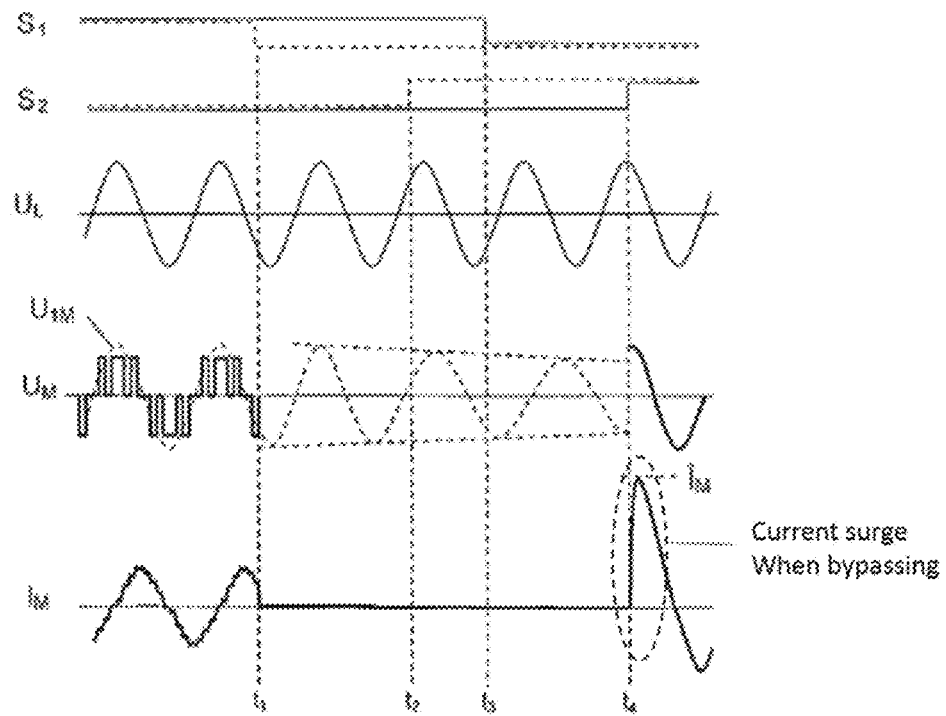
FIG. 3 presents how the change of supply of the motor can occur using the connecting device of prior art.
Figure 4:
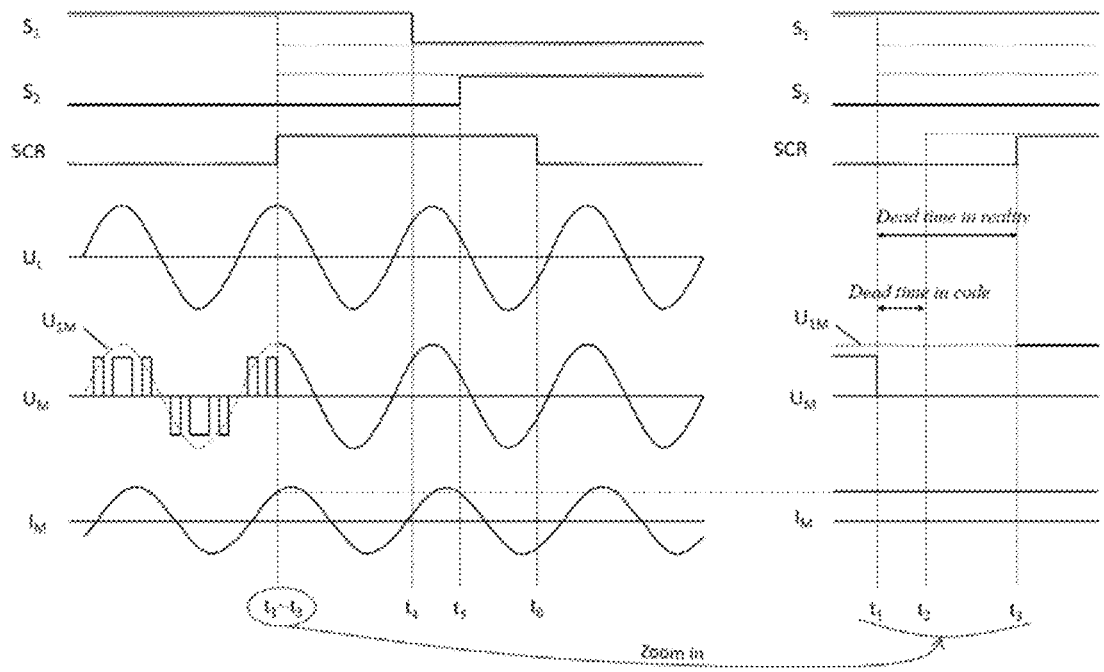
FIG. 4 presents how the change of supply of the motor can occur using the connecting device according to the present invention.

In the following, the working process in the embodiment of FIG. 2 will be described in detail with reference to FIGS. 3 and 4, wherein, FIG. 3 presents how the change of supply of the motor can occur using the connecting device according to prior art as shown by FIG. 1, and FIG. 4 presents how the corresponding change of supply of the motor can occur using the connecting device as shown by FIG. 2. The signal markings used in the figures are as follows:

$S_1$, $S_2$ and SCR present respectively the positions of the first contactors $S_1$, the second contactors $S_2$ and the bidirectional Silicon Controlled Rectifier (SCR) as a function of time, signal up=the contactor is in the closed position,
signal down=the contactor is in the open position,
dashed line=the command signal of the control unit,
unbroken line=actual positions of contactors and SCR;

$U_L$ presents the curve of one main voltage of the supply network current, the cycle time of which is, e.g., 20 ms;

$U_M$ presents the curve of the corresponding main voltage in the connection point of the motor;

$I_M$ presents the curve of one phase current of the motor over time.

In the conventional system illustrated in FIG. 3, the contactor $S_1$ is closed before the time $t_1$, so that the motor M operates supplied by the VFD. When the motor is in a stable operation state, at the time $t_1$, a stopping command is given to the VFD by the control unit, which achieves disconnection of the output voltage, it forms very quickly, e.g. at a microsecond level. After the supply voltage has disconnected, the phase current of the motor also disconnects quickly. However, the voltage in the connection point of the motor remains up and decays gradually over time, owing to the rotation movement of the rotor and the residual flux of the magnetic circuit. At the same time, an opening command is given to the first contactor $S_1$ by the control unit, but the first contactor $S_1$ is opened actually at the time $t_3$ for the delay of the contactor itself. At the time $t_2$, a closing command is given to the second contactor $S_2$, and also, the second contactor $S_2$ is actually closed at the time $t_4$ for the delay of the contactor itself. The residual voltage of the motor is proportional to the rotation speed of the motor, and the rotation speed of the motor decelerates gradually during the dead time $t_1 \sim t_4$, as a result of which, the longer the time interval $t_1 \sim t_4$, the more unpredictable is the phase shift of the residual voltage with respect to the supply network, and the larger is the amplitude difference. In the case according to the conventional systems illustrated in FIG. 3, the phase is shift at the time $t_4$ is 180°, in which case the connection current surge $I_M$ when the second contactor $S_2$ actually closes is very large. It is understood by those skilled in the art that it can be configured that the time at which a closing command is given to the second contactor $S_2$ lags behind the time at which a opening command is given to the first contactor $S_1$, so that it can be ensured that the VFD has been disconnected completely before closing the second contactor $S_2$.

Now referring to FIG. 4, in the present invention, the motor M firstly operates supplied by the VFD, during which the first contactor $S_1$ is closed and the voltage $U_M$ in the connection point of the motor M is supplied by the VFD, wherein the fundamental wave of the voltage pattern is presented by the curve $U_{1M}$ with dashed lines. It can be seen that the fundamental wave of the voltage formed by the VFD has been made to be co-phasal with and the same magnitude as the supply network voltage $U_L$ in the situation presented in FIG. 4.

When the motor is in a stable operation state, at the time $t_1$, a stopping command is given to the VFD by the control unit, which achieves disconnection of the output voltage, it forms very quickly, e.g. at a microsecond level. At the same time, an opening command is given to the first contactor $S_1$ and a closing command is given to the second contactor $S_2$. In this embodiment, the delay time of the first contactor $S_1$ is 18 ms and that of the second contactor $S_2$ is 23 ms. Therefore, the first contactor $S_1$ is opened actually at the time $t_4$ and the second contactor $S_2$ is closed actually at the time $t_5$ after $t_4$. At the time $t_2$, a closing command is given to the bidirectional Silicon Controlled Rectifier (SCR) by the control unit. The bidirectional Silicon Controlled Rectifier (SCR) is closed actually at the time $t_3$ and the motor M is supplied through the bypass. Because the SCR is "touch-and-go", $t_2 \sim t_3$ is a very short interval (at the microsecond level). Then, at the time $t_6$, which is after the time $t_5$ when the second contactor $S_2$ is closed actually, an opening command is given to the bidirectional Silicon Controlled Rectifier (SCR) by the control unit, so that the switch from the first contactor $S_1$ to the second contactor $S_2$ is achieved.

Using the connecting device of the present invention, the dead time of the motor M during the switch of contactors is very short, for example, at the microsecond level. As can be seen from FIG. 4, $t_1 \sim t_2$ is the dead time in code and $t_1 \sim t_3$ is the dead time in reality. Therefore, the bypassing time for switching from the first contactor $S_1$ to the second contactor $S_2$ is almost zero (<10 μs).

Furthermore, the phase current and residual voltage of the motor M are almost unchanged during the time interval $t_1 \sim t_3$ which is at the microsecond level. At the time $t_3$, the bidirectional Silicon Controlled Rectifier (SCR) is closed actually, which ensures the smooth switch of the contactors. At the time $t_5$ when the second contactor $S_2$ is closed actually, there are no phase difference and amplitude difference between the voltage $U_M$ of the motor and the supply network voltage $U_L$, thus no switching current surge will occur. Therefore, there is no need to overrate the cables and contactors of the supply device, and the SCR is a cheap device, so that the cost is greatly saved.

Figure 5:
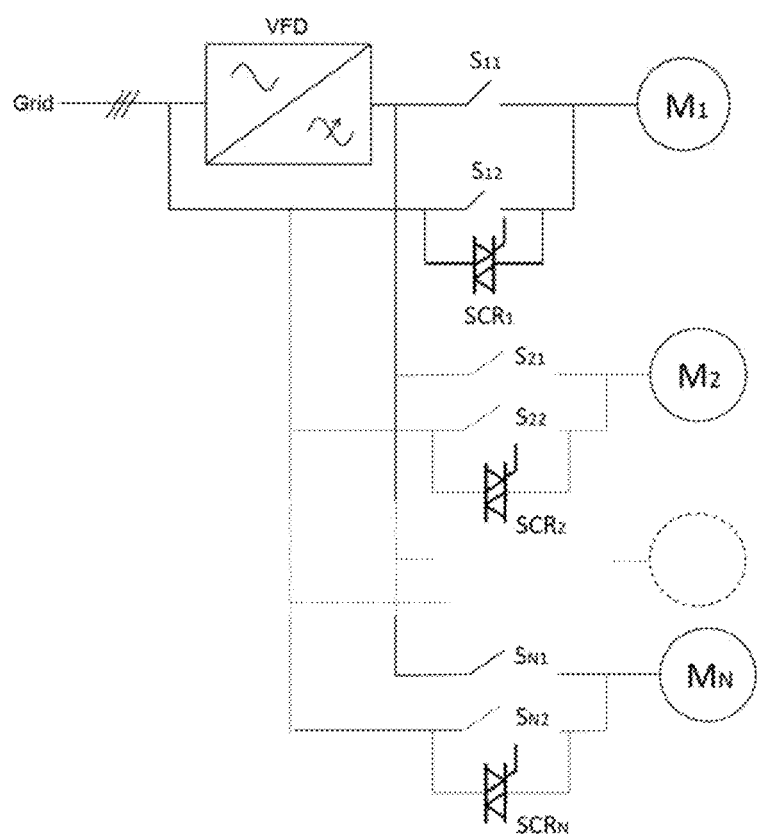
FIG. 5 is the schematic diagram in which the supply network is connected to a plurality of motors with a plurality of connecting devices of the present invention.

According to a further embodiment of the present invention, the supply network is connected to a plurality of motors with a plurality of connecting devices of the former embodiment, as shown in FIG. 5.

Figure 6:
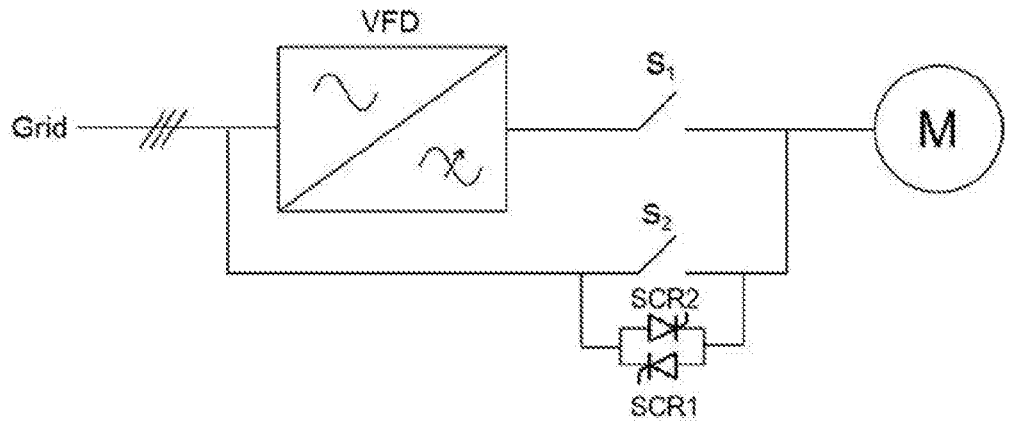
FIG. 6 is the structure diagram of a connecting device for motor and supply network according to another embodiment of the present invention.

According to the other embodiments of the present invention, the bidirectional Silicon Controlled Rectifier (SCR) is replaced by two anti-parallel single-directional Silicon Controlled Rectifiers SCR1 and SCR2, as shown in FIG. 6.

According to the other embodiments of the present invention, the contactors can be any kind of switching devices well known in the art.

In one embodiment, the delay time of the contactor is ≤100 ms; and in a further embodiment, the delay time of the contactor is ≤200 ms. It can be understood by those skilled in the art that the delay times of the first contactor and the second contactor are not limited in the present invention.

According to the other embodiments of the present invention, the control unit for giving commands can be arranged outside the VFD, even be a controller arranged outside the connecting device.

Figure 7A:
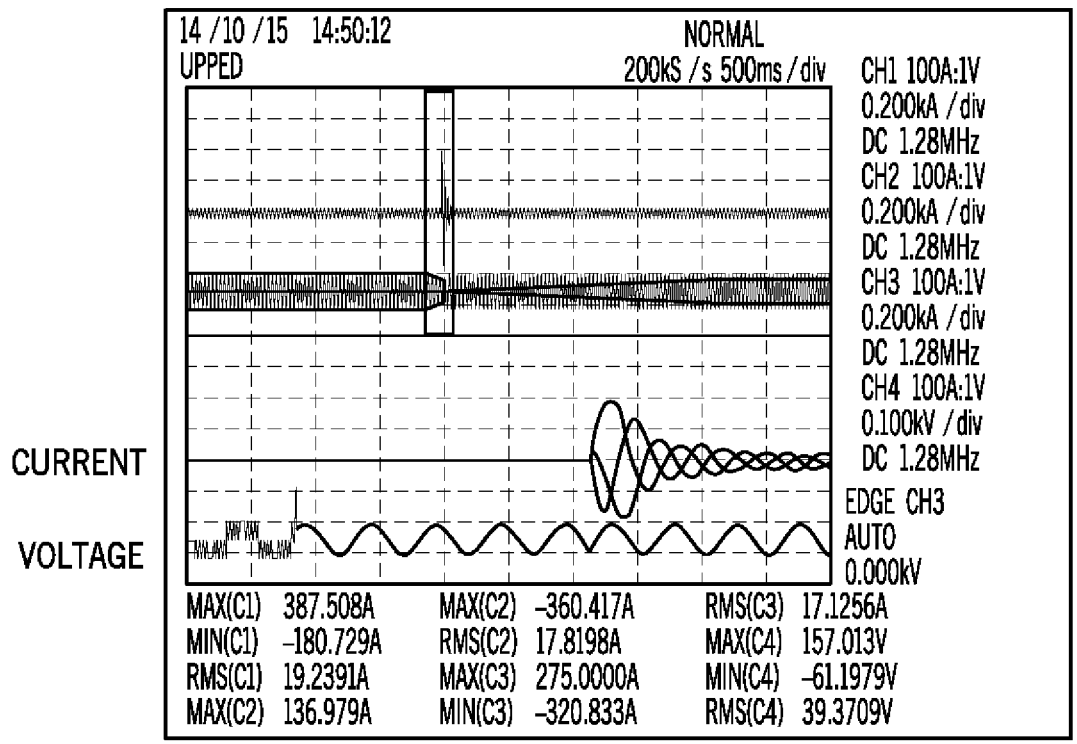
FIG. 7a shows the experimental switching current surge using the connecting device for motor and supply network of the prior art.
Figure 7B:
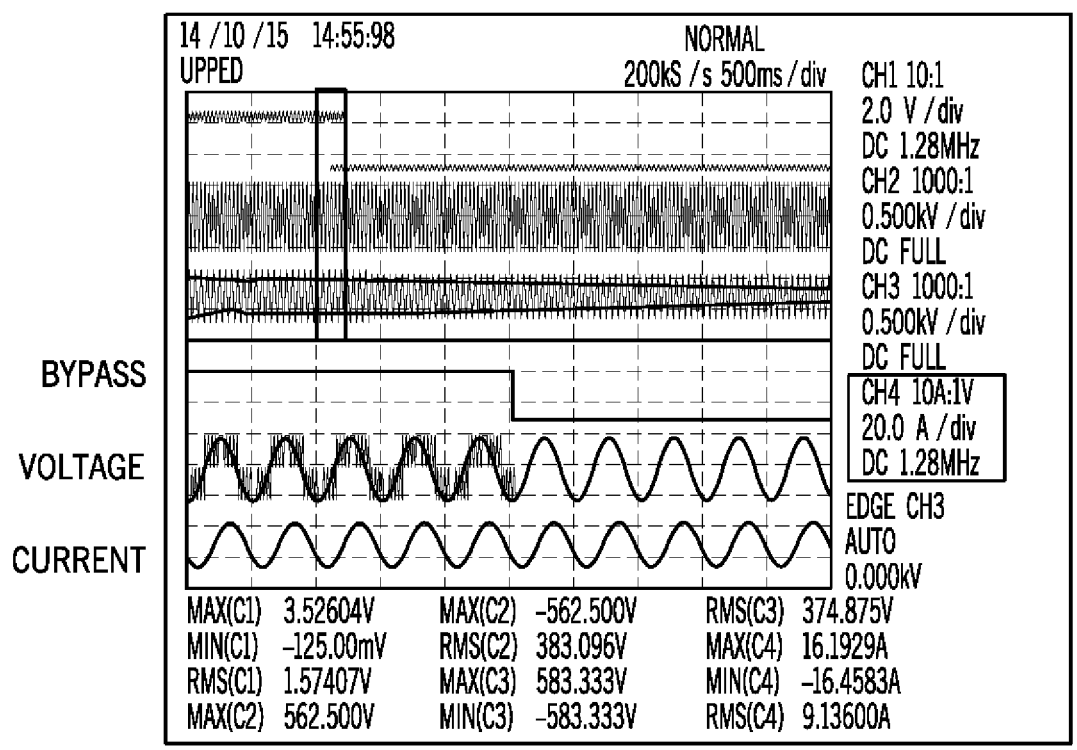
FIG. 7b shows the experimental switching current surge using the connecting device for motor and supply network of the present invention.

In order to fully explain the advantages of the present invention, the is inventor compares the experimental switching current surge through the motor of the present invention and that of the prior art, and the experimental results are shown in FIGS. 7a and 7b. FIG. 7a is the experimental result of the prior art, and it can be seen that the peak current is 387.50 A, which is 23 times the steady state peak current (16.46 A); and FIG. 7b is the experimental result of the present invention, and it can be seen that the peak current is 16.46 A, which is equal to the steady state peak current and means that the current surge is zero.

Embodiments of the present invention have been described in terms of the preferred embodiment, but it is recognized that the present invention is not limited solely to the embodiment described above, it may be varied within the scope of the appending claims.

The invention claimed is:

1. A connecting device for motor and supply network, comprising: a Variable Frequency Drive (VFD), a first switch and a second switch, wherein the VFD is connected in series to the first switch, and the second switch is connected in parallel to the series circuit composed of the VFD and the first switch, which is characterized in that:
    further comprising:
        a bidirectional Silicon Controlled Rectifier (SCR) which is connected in parallel to the second switch; and
        a control unit configured to:
            during a stable operation state of a motor, transmit an opening command to the first switch and a closing command to the second switch;
            transmit a closing command to the bidirectional SCR after transmission of the closing command to the second switch; and
            transmit an opening command to the bidirectional SCR after the second switch has closed.

2. The connecting device according to claim 1, wherein at least one of the first switch and the second switch is a contactor.

3. The connecting device according to claim 1, further comprising a control unit for giving commands.

4. The connecting device according to claim 3, wherein the control unit is arranged within the Variable Frequency Drive (VFD).

5. A connecting device for motor and supply network, comprising: a Variable Frequency Drive (VFD), a first switch and a second switch, wherein the VFD is connected in series to the first switch, and the second switch is connected in parallel to the series circuit composed of the VFD and the first switch, which is characterized in that:
    further comprising:
        two anti-parallel single-directional Silicon Controlled Rectifiers which are connected in parallel to the second switch; and
        a control unit configured to:
            during a stable operation state of a motor, transmit an opening command to the first switch and a closing command to the second switch;
            transmit a closing command to the two anti-parallel single-directional Silicon Controlled Rectifiers after transmission of the closing command to the second switch; and
            transmit an opening command to the two anti-parallel single-directional Silicon Controlled Rectifiers after the second switch has closed.

6. The connecting device according to claim 5, wherein at least one of the first switch and the second switch is a contactor.

7. The connecting device according to claim 5, further comprising a control unit for giving commands.

8. The connecting device according to claim 7, wherein the control unit is arranged within the Variable Frequency Drive (VFD).

* * * * *